(12) United States Patent
Iannone

(10) Patent No.: US 11,080,742 B1
(45) Date of Patent: Aug. 3, 2021

(54) METHODS, DEVICES, AND SYSTEMS FOR DISH DATA GENERATION AND TRACKING

(71) Applicant: Louis Iannone, Apex, NC (US)

(72) Inventor: Louis Iannone, Apex, NC (US)

( * ) Notice: Subject to any disclaimer, the term of this patent is extended or adjusted under 35 U.S.C. 154(b) by 0 days.

(21) Appl. No.: 17/172,777

(22) Filed: Feb. 10, 2021

Related U.S. Application Data

(63) Continuation-in-part of application No. 16/995,259, filed on Aug. 17, 2020, now Pat. No. 10,984,064.

(51) Int. Cl.
| | |
|---|---|
| *G06Q 30/02* | (2012.01) |
| *G06F 16/901* | (2019.01) |
| *G06F 9/54* | (2006.01) |
| *H04L 29/06* | (2006.01) |
| *G06F 16/9535* | (2019.01) |

(52) U.S. Cl.
CPC ......... *G06Q 30/0226* (2013.01); *G06F 9/547* (2013.01); *G06F 16/9017* (2019.01); *G06F 16/9535* (2019.01); *H04L 63/0884* (2013.01)

(58) Field of Classification Search
CPC . G06Q 30/0266; G06Q 16/9554; G06F 16/33
USPC ............ 705/14.27, 14.51; 235/375; 707/736
See application file for complete search history.

(56) References Cited

U.S. PATENT DOCUMENTS

| | | | | |
|---|---|---|---|---|
| 2002/0007307 A1* | 1/2002 | Miller | ............... | G06Q 30/0273 705/14.53 |
| 2002/0065720 A1* | 5/2002 | Carswell | ............... | G06Q 30/02 705/14.26 |
| 2003/0158796 A1* | 8/2003 | Balent | ................. | G06Q 10/087 705/28 |
| 2014/0144977 A1* | 5/2014 | Argue | ............... | G06Q 30/0633 235/375 |
| 2016/0203352 A1* | 7/2016 | Marsico | ................ | G16H 20/60 235/375 |
| 2020/0342781 A1* | 10/2020 | Kraut-Reinkober | ......................... | A47J 43/0716 |
| 2020/0387122 A1* | 12/2020 | Jepperson | .............. | F25D 13/06 |

* cited by examiner

*Primary Examiner* — Allyson N Trail
(74) *Attorney, Agent, or Firm* — NK Patent Law

(57) ABSTRACT

A dish data generation and tracking system generates a universal dish identifier based on a specific recipe for a particular dish provided by a user. The universal dish identifier is stored as part of the user's profile and may be sent directly to one or more third-party grocery loyalty accounts associated with the user. The universal dish identifier associates numerous specific, unrelated recipes from various sources for a particular dish, such that new data about dishes for which a customer is shopping is generated, and that newly generated data can be used by grocers to better understand the shopping and recipe-locating habits of their customers. Having the universal dish identifier directly added to the user's grocery loyalty account provided additional information to the grocer, and removes the need for the user to scan the universal dish identifier at the point of sale.

20 Claims, 11 Drawing Sheets

| DISH 250 | UNIVERSAL DISH IDENTIFIER 252 | SCANNABLE CODE 254 | SPECIFIC RECIPE INFORMATION 256 |
|---|---|---|---|
| CHICKEN PARMESAN 258 | 1234567890 |  1234567890 | HTTP://WWW.XYZ.COM<br>HTTP://WWW.ABC.COM |
| LASAGNA 260 | 9876543210 |  9876543210 |  |
| PULLED PORK 262 | 3219874560 |  3219874560 | HTTP://WWW.DEF.COM |

METHODS, DEVICES, AND SYSTEMS FOR DISH DATA GENERATION AND TRACKING

CROSS-REFERENCE TO RELATED APPLICATIONS

This application is a continuation-in-part of U.S. patent application Ser. No. 16/995,259 by Louis Iannone, titled "METHODS, DEVICES, AND SYSTEMS FOR DISH DATA GENERATION AND TRACKING," filed on Aug. 17, 2020, the entire disclosure of which is hereby incorporated by reference.

TECHNICAL FIELD

The present invention relates to a server application, a web application, and a client/server infrastructure; and more specifically to methods, devices, and systems for generating new data based on unrelated specific recipes for a particular dish (i.e., variations of dish recipes from unrelated recipe sources) in the form of a universal dish identifier, which can be used by grocers for better tracking and linking of their customers' online shopping behavior.

BACKGROUND

Many grocery shoppers shop for particular recipes across multiple grocery stores. For example, a customer may shop for produce from a first store, meat and dairy from a second store, and pre-packaged goods from a third store.

Grocers are able to track a shopper's particular purchases during a trip to the grocery store, and over time over multiple of the shopper's trips to the grocery store. Many grocery stores offer a loyalty rewards program that allows them to associate a customer's particular purchases with that customer, which provides the grocery store with valuable marketing data and other data for analytics. However, when a customer shops at multiple stores, the data of what the customer buys from a particular grocery store becomes less reliable to the grocery store for its data analysis, as it does not represent a complete grocery list, but rather only a part of the grocery list. Additionally, grocery stores have no way to track which particular dishes for which a customer is shopping, nor do they have a way to track the sources of the recipes for the dishes for which customers are shopping.

Accordingly, a need exists for a system that generates and provides new data linking a particular grocery store customer's shopping habits with the dish for which the customer is shopping and/or the sources of recipes for that dish that the customer is using outside of the grocer's own existing data-tracking system, regardless of whether the customer only buys some of the required ingredients at any particular store.

SUMMARY

The presently disclosed subject matter is directed toward methods, devices, and systems for solving the problem of generating new data based on recipe information and providing that newly generated data to the grocery store such that it can be linked to customer loyalty data.

In one embodiment, a server is disclosed. The server includes a memory, a database, and a processor configured to perform a method of generating dish data for a dish described by one of a plurality of recipes for the dish. The method that the processor is configured to perform includes receiving recipe data that describes the dish. The recipe data is received as part of an electronic request from an application running on a client device associated with the user. The method that the processor is configured to perform further includes identifying the dish described by the received recipe data. The method that the processor is configured to perform further includes generating a universal dish identifier for the identified dish in response to a determination that the identified dish does not already have an associated universal dish identifier. The determination is made by performing a lookup for the identified dish in the database. The method that the processor is configured to perform further includes requesting, from a third-party server, an electronically scannable code associated with the universal dish identifier. The electronically scannable code encodes the universal dish identifier such that the universal dish identifier can be decoded at a point-of-sale system. The method that the processor is configured to perform further includes transmitting the electronically scannable code associated with the encoded universal dish identifier to the requesting user such that the electronically scannable code is available to the user to be scanned and decoded by a point-of-sale system of a grocer.

In one embodiment, a server is disclosed. The server includes a memory, a database, and a processor that generates dish data for a dish described by one of a plurality of recipes for the dish. The processor is configured for receiving recipe data that describes the dish. The recipe data is received as part of an electronic request from an application running on a client device associated with the user. The processor is further configured for identifying the dish described by the received recipe data. The processor is further configured for generating a universal dish identifier for the identified dish in response to a determination that the identified dish does not already have an associated universal dish identifier. The determination is made by performing a lookup for the identified dish in the database. The processor is further configured for receiving grocery loyalty account information from the user. The processor is further configured for creating, using the received grocery loyalty account information, a connection to a third-party website associated with the received grocery loyalty account information. The connection is specific to the user. The processor is further configured for transmitting the generated universal dish identifier to the third-party website associated with the received grocery loyalty account information over the connection.

In one embodiment, a server is disclosed. The server includes a memory, a database, and a processor that generates dish data for a dish described by one of a plurality of recipes for the dish. The processor is configured for receiving recipe data that describes the dish. The recipe data is received as part of an electronic request from an application running on a client device associated with the user. The electronic request is received in response to the user of the client device activating a link button associated with the recipe data displayed on a website. The processor is further configured for identifying the dish described by the received recipe data. The processor is further configured for generating a universal dish identifier for the identified dish in response to a determination that the identified dish does not already have an associated universal dish identifier. The determination is made by performing a lookup for the identified dish in the database. The processor is further configured for storing the universal dish identifier in the database, wherein the universal dish identifier is stored associated with the user as part of a user profile for the user.

In another embodiment, a non-transitory computer readable medium comprising a plurality of machine-readable instructions is disclosed. When executed by one or more processors of a server, the machine-readable instructions cause the server to perform a method of generating dish data for a dish described by one of a plurality of recipes for the dish. The method includes receiving recipe data that describes the dish. The recipe data is received as part of an electronic request from an application running on a client device associated with the user. The method further includes identifying the dish described by the received recipe data. The method further includes generating a universal dish identifier for the identified dish in response to a determination that the identified dish does not already have an associated universal dish identifier, wherein the determination is made by performing a lookup for the identified dish in a database associated with the server. The method further includes requesting, from a third-party server, an electronically scannable code associated with the universal dish identifier. The electronically scannable code encodes the universal dish identifier such that the universal dish identifier can be decoded at a point-of-sale system. The method further includes transmitting the electronically scannable code associated with the encoded universal dish identifier to the requesting user such that the electronically scannable code is available to the user to be scanned and decoded by a point-of-sale system of a grocer.

In another embodiment, a method implemented on at least one server for generating dish data for a dish described by one of a plurality of recipes for the dish is disclosed. The method includes receiving recipe data that describes the dish. The recipe data is received as part of an electronic request from an application running on a client device associated with the user. The method further includes identifying the dish described by the received recipe data. The method further includes generating a universal dish identifier for the identified dish in response to a determination that the identified dish does not already have an associated universal dish identifier. The determination is made by performing a lookup for the identified dish in a database associated with the server. The method further includes requesting, from a third-party server, an electronically scannable code associated with the universal dish identifier. The electronically scannable code encodes the universal dish identifier such that the universal dish identifier can be decoded at a point-of-sale system. The method further includes transmitting the electronically scannable code associated with the encoded universal dish identifier to the requesting user such that the electronically scannable code is available to the user to be scanned and decoded by a point-of-sale system of a grocer.

In various embodiments, the electronically scannable code is transmitted by transmitting a link to a standalone webpage generated by the server that displays the electronically scannable code when the link is accessed from the client device.

In various embodiments, the received recipe data is in the form of a photograph of the recipe data.

In various embodiments, the electronically scannable code is transmitted by transmitting the photograph of the recipe data with the electronically scannable code overlaid on the photograph. The overlaid photograph is generated by the server.

In various embodiments, the electronically scannable code is transmitted by transmitting an embeddable web component configured to display the electronically scannable code when the embeddable web component is embedded in a webpage. The embeddable web component is generated by the server.

In various embodiments, the dish described by the received recipe data is identified based on information contained in the received recipe data.

In various embodiments, the dish described by the received recipe data is identified based on input from the user.

In various embodiments, the universal dish identifier is encoded into the electronically scannable code based on input from the user.

In various embodiments, the server further transmits one or more universal dish identifiers to a third-party server.

In various embodiments, the received grocery loyalty account information includes an identifier for a particular grocer.

In various embodiments, the received grocery loyalty account information includes the user's loyalty account number.

In various embodiments, the received grocery loyalty account information includes the user's login information for a third-party grocery website.

In various embodiments, the connection to the third-party website associated with the received grocery loyalty account information is created using an API.

In various embodiments, the connection to the third-party website associated with the received grocery loyalty account information is created using OAuth authentication.

In various embodiments, the processor is further configured for transmitting additional recipe data to the third-party website associated with the received grocery loyalty account information over the connection along with the generated universal dish identifier.

DETAILED DESCRIPTION

Figure 1A:
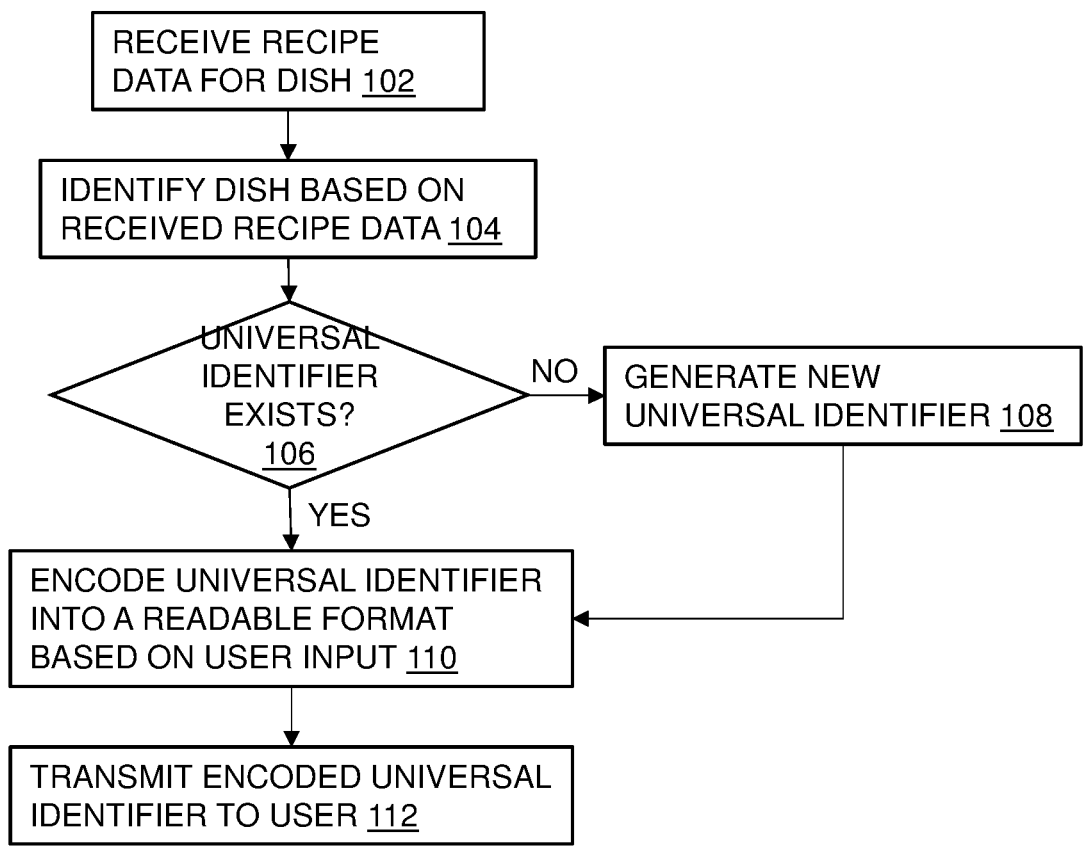
FIG. 1A depicts a flow chart 100 illustrating an exemplary method of the dish data generation and tracking system described herein implemented on a back-end server.

The following description and figures are illustrative and are not to be construed as limiting. Numerous specific details are described to provide a thorough understanding of the disclosure. In certain instances, however, well-known or conventional details are not described in order to avoid obscuring the description. References to "one embodiment" or "an embodiment" in the present disclosure may be (but are not necessarily) references to the same embodiment, and such references mean at least one of the embodiments.

Reference in this specification to "one embodiment" or "an embodiment" means that a particular feature, structure, or characteristic described in connection with the embodiment is included in at least one embodiment of the disclosure. Multiple appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Cooking to a menu or recipe is a widespread pursuit in American culture, to the extent that at least two television networks are dedicated entirely to cooking. There are also several cooking magazines with subscription circulations of over 1,000,000 subscribers. Grocers sell the ingredients to prepare specific recipes for a particular dish, but they lack a system that allows them to track which particular dishes their customers prepare and/or which specific recipes they are using when preparing a particular dish.

As explained above, grocers, retailers, and/or manufacturers have previously had no reliable way of determining or gathering customer data that identifies a particular dish for which a customer is shopping. The dish data generation and tracking system described herein solves this problem by generating this particular new piece of data for the grocers/retailers/manufacturers. The knowledge of what particular dishes customers prepare and what ingredients they buy to prepare a particular dish based on a specific recipe is valuable to grocers, retailers, and manufacturers. Conventional grocery sales data analysis relies on identifying what products customers buy, which is obtained by tracking customer purchases at the point of sale. Grocers also identify specific customers' purchases by scanning customer loyalty cards, and then target the identified customers for email or mail promotions, based on analysis of their specific purchases. As explained, however, current data analysis does not provide information on what customers prepare with the products purchased.

Disclosed herein are methods, devices, and systems for solving the problem of generating and tracking new data identifying the particular dish for which a customer is shopping and providing that newly generated data to a grocer or other retailer, which allows the grocer/retailer to link the particular dish with the customer's loyalty account. That newly generated data may be provided directly to the grocer or other retailer through a back-end connection, or it may be provided indirectly by the user (e.g., via scanning a barcode or QR code at the grocer's point of sale system).

The dish data generation and tracking system described herein provides a means to capture information about a customer's dish-selection and recipe-selection behaviors that occur outside of the confines of the grocery-store ecosystem and generate new, actionable data that is imported into the grocery-store ecosystem such that specific in-store purchases can be linked to out-of-store behavior. The new data provides for a linking of dishes a customer is shopping to prepare, the specific recipe the customer is shopping from, and the products they end up buying to prepare the dishes. The matched dish, recipe, and/or products purchased data may also be linked to specific customers through customer loyalty accounts, or the new data may be entirely anonymous. Thus, the recipe identification and classification system described herein combines a pre-defined activity (e.g., preparing a recipe), a pre-defined shopping list (e.g., list of ingredients required to prepare the recipe), and a universal dish identifier to link the grocery point-of-sale purchase to the pre-defined shopping list. The link may be accomplished, for example, by scanning an electronically scannable code that represents the universal dish identifier into the grocer's point-of-sale system, or it may be accomplished by directly transmitting the universal dish identifier from the system described herein to a grocer's back-end system where it is stored and associated with the user's grocery loyalty account. With nearly 40,000 grocery stores in the United States, and hundreds of transactions per store per day, an opportunity exists for very large amounts of market information to be created by the system described herein and captured by grocers, who may then analyze it and base marketing decisions on their analysis. Grocers rely heavily on sales data analysis to gain insight into their customers' product purchasing profile, and the system described herein adds direct insight into what dishes and/or recipes customers are preparing, in addition to the products purchased to implement those recipes.

Previously existing systems describe the data capture for recipe ingredients in terms of unique identifiers, such that each variation of a recipe for a particular dish (e.g., Chicken Parmesan) would have a unique identifier. In contrast, the dish data generation and tracking system described herein aggregates any number of recipe variations for the same dish (which could easily be in the multiple thousands for popular dishes) by classifying all variations of recipes for the same dish into one universal dish identifier, based upon a pre-set classification for the recipe contained in a universal dish identifier associated with the recipe. In this manner, if thousands of the uniquely classified identifiers for thousands of different recipes (or variations of recipes) for the same dish are scanned, a grocer obtains the identity of that one dish as expressed by the recipe, instead of thousands of different identities for the same dish.

Under previously existing systems, a grocer may have published its own recipe for a particular dish, assigned a unique identifier code and made that recipe and identifier available for shopping and scanning. This, however, is not how most consumers find the specific recipes that they use to prepare their dishes. Most consumers go to one of their preferred/favorite websites or preferred cookbooks, of which there are thousands in existence, and locate the dish and a recipe for that dish. The vast majority of customers would not use a grocer's recipe, and instead use recipes taken from their favorite sources. The dish data generation and tracking system described herein provides grocers with data about which of those sources of recipes (e.g., which websites, cookbooks, blogs, etc.) that their customers regularly use to better understand their customers and inform marketing decisions.

Because there are thousands of recipe sources, and a relatively smaller number of popular recipes, thousands of recipes for the same popular recipes exist. For example, if a person searches for a recipe for lasagna, pot roast, or some similar popular recipe, for example, a search engine would return thousands or even millions of recipes for that same dish. If every variation of a recipe for that particular dish were uniquely identified, then a grocer may be faced with 3,000 unique identity codes for 3,000 unique lasagna recipes. That amount of data compounded over 40,000 stores and 30-40 popular recipes, very big data indeed, would be impractical to analyze, and would require a tremendous amount of work after the data were collected.

The dish data generation and tracking system described herein classifies thousands of data points into a universal dish identifier that can be scanned at a point-of-sale system of a retailer. Thus, the system described herein refines a very large volume and variety of data that would be impractical to analyze into a far more refined body of data that is highly practical to analyze, achieving economies of scale in the analysis of the aggregated data and optimizing the reporting of recipe classification data to the retail location. For example, every one of 3,000 unique lasagna recipes may be classified into a single universal dish identifier that represents lasagna, every one of 3,000 unique spaghetti recipes may be classified into a single universal dish identifier that represents spaghetti, every one of 3,000 unique pot roast recipes may be classified into a single universal dish identifier that represents pot roasts, and so on. The universal dish identifier may further be associated with one or more additional attributes of classification that may be analyzed after collected. For example, Lasagna may be classified as Italian cuisine, ground beef main ingredient, tomato sauce and lasagna specific recipe. A universal dish identifier for Chicken Marsala would have similar attributes: Italian cuisine, chicken main ingredient, Marsala sauce, etc. As can be seen, some attributes of various universal dish identifiers are common across various recipes and/or dishes.

In various embodiments, the universal dish identifier described herein may be encoded into an electronically scannable code, such as a barcode, QR code, or other electronically scannable or electronically readable code. Such electronically scannable or electronically readable code may be scanned or recognized by standard point-of-sale systems. A schedule of the universal dish identifiers may be distributed periodically to users, such as grocers, retailers, and/or manufacturers. The system described herein maintains and updates a schedule of universal dish identifier and distributes the schedule of universal dish identifiers so as to be capable of use by any retailer.

The electronically scannable or electronically readable code encoded with the universal dish identifier may further include additional information about the recipe encoded at varying levels of granularity. In one embodiment, the level of granularity encoded into the electronically scannable code may be set or determined by the user.

The additional levels of granularity encoded into the electronically scannable or electronically readable code may include, for example, the source of the recipe (e.g., the specific website, TV show, cookbook, blog, etc.), the author of the recipe, and/or various characteristics of the particular dish.

In an embodiment, consumers may obtain a favorite recipe for a given dish, for example, a recipe for Chicken Parmesan. A universal dish identifier for the chosen dish (i.e., Chicken Parmesan) may be associated with the recipe and/or included within the recipe. The consumer may download the recipe and/or the universal dish identifier as a printed recipe card, as a screen shot from a webpage, as a mobile device image, or any other scannable representation that a consumer may present to the scanner associated with a retail point-of-sale system. The consumer takes the downloaded representation with them to a retail establishment, such as a grocery store or convenience store, where they may shop for the ingredients contained within the recipe. The consumer may present the recipe to the point-of-sale system for scanning, where the consumer may receive an incentive such as a coupon or other incentive for scanning the recipe. Upon scanning, the consumer receives the incentive, and the retail establishment receives information from the universal dish identifier on what particular dish the consumer is preparing. The universal dish identifier information would then be analyzed and placed within the proper aggregated dataset in which the scanned recipe is a member. In this fashion, the retail establishment would receive a more accurate count of the number of particular recipes are being presented for each category of dishes being prepared.

In an embodiment, the process for aggregating and analyzing the recipes being prepared by consumers based upon the presentation of the universal dish identifier may begin with segmenting recipes based upon the broadest category of food to which a recipe could belong in an established hierarchy for each dish. The categorization may be further refined by adding subsets of the broadest category until a particular dish as described in a recipe is established. For example, using the example of Chicken Parmesan, a top-level categorization may be a broad type of recipe, such as "Chicken-Based Recipe." The next-level categorization (i.e., second level) may be a type of cuisine, such as "Italian Cuisine." The next level categorization (i.e., third level) may be type of dish, such as "Chicken Parmesan." The next level categorization (i.e., fourth level) may be the specific recipe source, such as "Martha Stewart's website." Additional levels or subsets may be established to associate further relevant information about the recipe.

The system may create a scannable representation of the universal dish identifier. This scannable representation of the universal dish identifier may take the form of a bar code, QR code, or other code that may be included in a recipe such that when the consumer downloads the recipe, in any format such as print, web page, coupon, shopping list, or mobile device screen, the scannable universal dish identifier is included as a portion of the recipe. The categories within the universal dish identifier may be managed by a central authority that incorporates updates, additions, deletions, or modifications to the hierarchy, where the central authority may periodically distribute an updated list of the hierarchy and recipe categories to all retail establishments using the system.

When the consumer has completed shopping, the recipe containing the electronically scannable code associated with the universal dish identifier is presented at checkout and scanned by the retail point-of-sale system. The scanned data, including the universal dish identifier, is transferred to the retail establishment electronic file system for storage and later analysis. The data may then be analyzed, and all recipe information categorized and aggregated based upon category by an analytics process on behalf of the retail establishment. The recipe and data about the consumer is aggregated and stored in an electronic storage file system based upon recipe category. This category data, along with any additional analysis, is provided to management personnel of the retail establishment to permit the retail establishment to optimize advertising and sales programs.

Analysis of data collected from the scanned identifiers provides statistics that may drive marketing, advertising and merchandising strategy. For instance, if a grocer finds that certain stores have a large percentage of Italian recipes scanned, larger Italian ingredient displays may be implemented. If analysis indicates that a specific customer cooks specific recipes, incentives for matching ingredients may be offered by email.

Analytical results may be provided to a user to inform and activate programmatic direct marketing, programmatic direct advertising, and programmatic direct mail. Programmatic marketing provides for marketing actions that may take place automatically, without human intervention, driven by an automated system owned, managed and maintained by a retail establishment.

In a non-limiting example, where a retail establishment such as a grocer can connect a transaction with a specific customer and an email address or physical address, then when that customer presents a given recipe universal dish identifier and the universal dish identifier is scanned, an email or direct mail with programmed content would be automatically triggered to that specific customer. For example, when an Italian recipe identifier is scanned it could trigger a programmatic incentive or promotion to the customer for Chianti or some other Italian product.

In a non-limiting example, coupons, promotions, and advertising may be personalized and sent to a specific customer based on the recipe identifiers scanned when the specific customer interacts with a scanner or employee utilizing a scanner in a retail establishment. In this non-limiting example, a customer may present a universal dish identifier at any point during the shopping experience within the retail establishment, have the universal dish identifier scanned, and quickly receive promotions, incentives, coupons, and/or rewards that are personalized to the individual customer.

In a non-limiting example, the universal dish identifier may be scanned by a customer to enter into an online shopping process, for instance with an online retailer such as Amazon, and the online retailer could quickly return promotions, advertising, coupons, awards, and/or incentives to the customer. Additionally, a universal dish identifier could be scanned upon entry to a store, and generate "real-time" coupons before or during shopping, instead of after checking out.

In an embodiment, automatic responses to a scanned universal dish identifier may be transmitted by text to a mobile device associated with a customer.

In an embodiment, automatic responses to a scanned universal dish identifier could also be sent to advertisers, as well as to customers, to solicit the purchase of advertising. Advertising could be directed to a specific customer, or placed on a grocer's website, either generated in response to the scanning of a universal dish identifier linked to a particular recipe. For instance, scanning Italian recipe universal dish identifiers could generate a solicitation to every pasta manufacturer, who could then advertise on a grocer's website or send an ad directly to a customer.

The system implements the classification of thousands of data points into far more refined data points prior to the universal dish identifier being scanned into grocers' data systems. It refines a very large volume and variety of data that would be impractical to analyze into a far more refined body of data that is highly practical to analyze.

The system described herein provides a link between and among various interested entities or users of the system, including (1) the system provider, which is the entity that provides and maintains the dish data generation and tracking system described herein; (2) consumer-packaged goods manufacturers ("CPGs") that manufacture the products being sold at grocery stores, such as makers of spices, condiments, soup, pasta, wine, and the like; (3) grocers/retailers that sell goods manufactured by CPGs; (4) recipe creators, such as celebrity chefs/cooks, television cooking shows, home cooks, bloggers, vloggers, cookbook publishers, and the like; (5) advertisers; and (6) end-user customers.

The specific recipes used in the dish data generation and tracking system described herein may come from any recipe source, such as physical cookbooks (both currently existing and cookbooks to be printed in the future), magazines/newspaper articles (both print and online editions), websites (such as cooking websites and cooking blogs), cooking videos (such as vlogs or videos posted to Youtube®, and/or cooking television shows (such as Food Network® shows, Chopped®, Master Chef®, and the like). An advantage of the system described herein is that it applies to and can be used for specific recipes from any sources.

In one embodiment, the dish data generation and tracking system is a client/server architecture wherein a plurality of users may communicate using their client device with one of more physical servers. The client device may be a fixed client device such as a workstation and/or personal computer. In other embodiments the client device may be a mobile client device such as a tablet or a laptop. The server may be implemented as one or more servers including physical servers, virtual servers, servers housed in containers, or the like.

FIG. 1 depicts a flow chart 100 illustrating an exemplary method of the dish data generation and tracking system described herein implemented on a back-end server.

In step 102, the back-end server receives recipe data for a particular dish. The recipe data may be received electronically over an Internet connection from a user of the system. The recipe data may be received as part of an electronic request from an application running on a client device associated with the user. The recipe data my represent a specific recipe out of many recipes for a particular dish. The user may be an end-user grocery shopper or a recipe provider. The recipe data may be received from the various types of users of the recipe classification and identification system, described above, through either the system provider's mobile application or through a web-based online portal to the system.

For example, a user may have located a specific recipe for a Chicken Parmesan dish. The specific recipe for Chicken Parmesan may be located online, or it may be printed in a cookbook. The user requests a universal dish identifier for the particular Chicken Parmesan recipe that they located. The user may send the request through the system provider's mobile app or through the system provider's web-based portal. The request from the user may include the recipe for which the user is seeking the universal dish identifier, for example, a link to a website where the recipe is published (e.g., a recipe server), or a photograph of a paper recipe (e.g., cookbook, recipe card, etc.).

In step 104, the received recipe data is used to identify the dish. The back-end server identifies the dish described by the received recipe data based on the received recipe data. This may be accomplished in a number of ways. For example, the dish may be identified using information provided by the user through the system provider's mobile application or through the web-based online portal to the system. The user may be presented with a drop-down or searchable menu that allows the user to select the identity of the dish. The options available for selection in the drop-down or searchable menu may be pulled from the back-end database. If the dish does not already exist in the system (e.g., in the database), the user may input the identification of the dish into the system by typing and saving it to the system, at which point the system adds an entry in the database for the newly added dish. In other embodiments, the dish may be identified using computer identification, such as by using text-recognition of the title of the recipe or the list of ingredients/cooking instructions, or by using image-recognition of pictures of the prepared recipe. The computer identification may use a machine-learning model to identify the dish based on the information in the recipe.

In the example of the specific recipe for Chicken Parmesan located by the user, the user may select "Chicken Parmesan" from a drop-down menu. If "Chicken Parmesan" does not already exist in the system, the user may add "Chicken Parmesan" to the system, for example by typing it into a text-input field, as which point a new database entry for "Chicken Parmesan" will be created.

At decision point 106, the back-end server determines whether a universal dish identifier already exists for the identified dish, as determined in step 104. This determination may be made by performing a database lookup at the back-end server to see if the identified dish already exists in the database with an associated universal dish identifier.

In the example of the particular Chicken Parmesan recipe located by the user, the system determines if a universal dish identifier already exists for "Chicken Parmesan" by performing a database lookup to see if "Chicken Parmesan" has an existing entry in the database with a universal dish identifier associated with the entry.

If no universal dish identifier already exists for the identified dish, then a new universal dish identifier is generated, at step 108. Whether the universal dish identifier already exists or is newly generated, the universal dish identifier is encoded into an electronically readable format, at step 110. The universal dish identifier may be added to the user's profile within the system (e.g., stored at the back-end server associated with the user). As explained in more detail in the context of FIG. 2B, the universal dish identifier may be encoded into an electronically readable format by requesting, from a third-party server, such as a barcode generator or QR code generator. The barcode or QR code is generated and sent back to the server. The barcode or QR code is associated at the server with the universal dish identifier. The barcode or QR code encodes the universal dish identifier such that the universal dish identifier can be decoded at a point-of-sale system. Additionally, the barcode may include a unique number string representing the universal dish identifier that can be keyed directly into a grocer's point-of-sale system, for example, if the grocer's point-of-sale system fails to read the barcode for any reason).

In some embodiments, the universal dish identifier may be encoded based, at least in part, on user input. For example, the user may select through the system provider's mobile app or web-based portal additional information or levels of identification information to be encoded along with the universal dish identifier.

At step 112, the encoded universal dish identifier is transmitted to the requesting user. In one embodiment, the encoded universal dish identifier is transmitted to the requesting user by transmitting the electronically scannable code associated with the encoded universal dish identifier (e.g., barcode or QR code) to the requesting user, the electronically scannable code will then be available to the user to be scanned and decoded by a point-of-sale system of a grocer, which allows the grocer to access the information associated with the universal dish identifier. As explained previously, the user may be any of the various entities described above. Based on the particular type of user, the encoded universal dish identifier may be transmitted in various formats, as explained in more detail in the context of FIG. 2A.

Figure 1B:
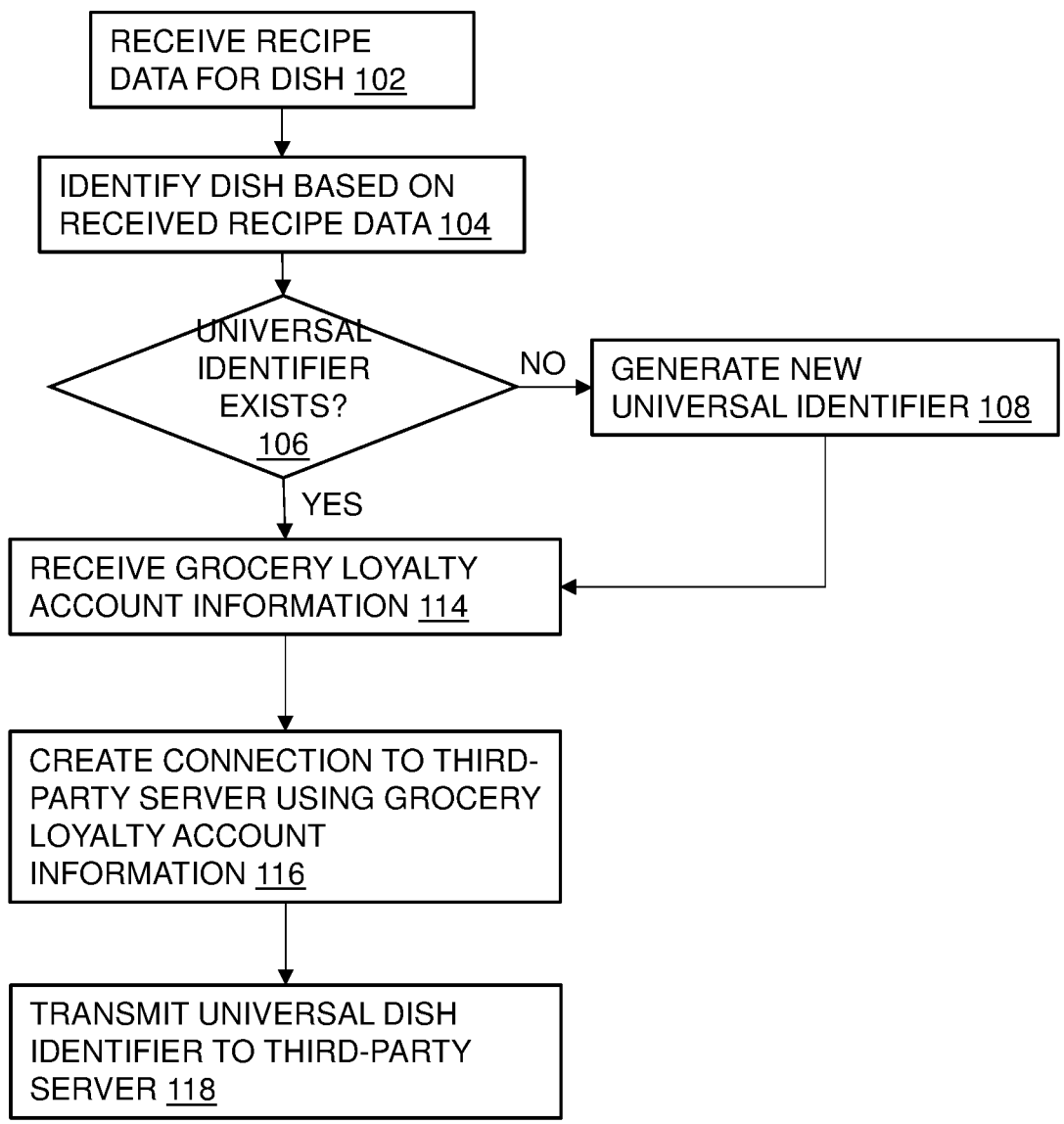
FIG. 1B depicts a flow chart 150 illustrating an exemplary method of the dish data generation and tracking system described herein implemented on a back-end server, where the universal dish identifier is provided directly to a third-party grocery loyalty account.

FIG. 1B depicts a flow chart 150 illustrating an exemplary method of the dish data generation and tracking system described herein implemented on a back-end server, where the universal dish identifier is provided directly to a third-party grocery loyalty account. By providing the universal dish identifier directly to a third-party grocery loyalty account, the customer's recipe information is linked to the grocer for the user. In other words, this is a variation of the linking described herein, but it provides a direct link to the grocer rather than a link that is established when the customer scans their loyalty card and then the universal dish identifier (e.g., the generated barcode) at the grocer's point-of-sale system, for example.

Referring to FIG. 1B, the initial steps 102-108 are the same as in FIG. 1A. Where the method of FIG. 1B differs is that, rather than send the universal dish identifier to the user to be later scanned at a point of sale, the server sends the universal dish identifier directly to one or more third-party servers where it can be directly associated with the user's grocery loyalty account.

At step 114, the server receives grocery loyalty account information from the user. This grocery loyalty account information may be provided by the user directly through the mobile application or desktop application. In one embodiment, the user is presented with an option of all grocers to which the system is able to connect, and the user selects one or more of the relevant grocers. With the grocers selected, the user may then provide login information or other identifying information (such as loyalty account number, email address, phone number, etc.) to the server.

At step 116, a connection to a third-party server is created using the user's grocery loyalty account information. This connection may be made either by the back-end server of the system described herein, or it may be made by the client device (e.g., the mobile app or desktop application). In one embodiment, the connection is made using APIs that are made available by the grocer's websites. In one embodiment, the user is authenticated on the third-party grocer's website using OAuth, which allows the user to login to the third-party website via the system disclosed herein.

At step 118, the universal dish identifier is transmitted to the third-party server. This has the effect of associating the particular dish with one or more of the user's loyalty accounts at one or more particular grocers. As part of, or in addition to, the universal dish identifier being transmitted, additional information about the dish may also be transmitted, such as for example, the source of the recipe, the ingredients, etc. Any information that may be included in the electronically scannable code may be provided directly to the third-party website, either with or without the actual scannable code. As will be understood by a person skilled in the art, the benefit of the electronically scannable code is that it allows the information to later be read into a point-of-sale system in a standardized way. When the same information is transmitted directly to the grocer's server, in such a case the electronically scannable code may not be necessary (although it may still be beneficial for the grocer to have).

It will be understood here that the order of the steps of FIG. 1B need not be fixed. In other words, the user may first log in to one or more third-party grocer websites before separately sending dish data and getting the universal dish identifier. It will further be understood that the methods of FIGS. 1A and 1B are not mutually exclusive, such that they can both be performed together, meaning that the universal dish identifier may be directly sent to the third-party grocery server (as shown in FIG. 1B) and also encoded into a readable format and sent to the user (as shown in FIG. 1A).

The back-end server configured to implement the methods of FIG. 1A and/or FIG. 1B may be a physical server or a virtual server. In other embodiments, the back-end server may be located on a company premise, or located in any other type of datacenter. The back-end server may also be configured as a plurality of physical servers and/or virtual servers. In some embodiments, an Ubuntu® server may provide the virtual server and may be implemented as a separated operating system (OS) running on one or more physical (i.e., hardware implemented) servers. Any applicable virtual server may by be used for the Ubuntu® Server function. The Ubuntu® server or other server may be implemented within the Microsoft Azure®, Amazon Web Services (AWS®), IBM cloud computing, environment, or the like.

The client device may be a fixed device or a mobile device. For example, a fixed device may be a workstation, a personal computer (PC), a smart television (TV), or the like. The mobile device may be any computing device capable of being transported easily from a one location to another location without undue difficulty and one that is capable of functional connection with a back-end server regardless of its location. For example, the mobile device may be a smart tablet, a laptop, or the like. In certain embodiments, the fixed device may be fixed within a mobile vehicle.

In general, the client device as used with the dish data generation and tracking system may be any computing device providing a user input, display, and connectivity to one or more servers over a personal area network (PAN), a local area network (LAN) and/or a wide area network (WAN). The PAN may include Bluetooth® or Universal Serial Bus (USB). The LAN may include any combination of wired Ethernet and/or Wi-Fi access points. The WAN may include the Internet and/or another wide area private network. The WAN may also include any combination of 2G, 3G, 4G, and 5G networks. In some embodiments the WAN may include Data Over Cable Service Interface Specification (DOCSIS) networks and/or fiber networks such as passive optical networks (PONs). Access to the one or more servers may also be provided via a virtual private network (VPN) within any of the previously described networks.

Figure 2A:
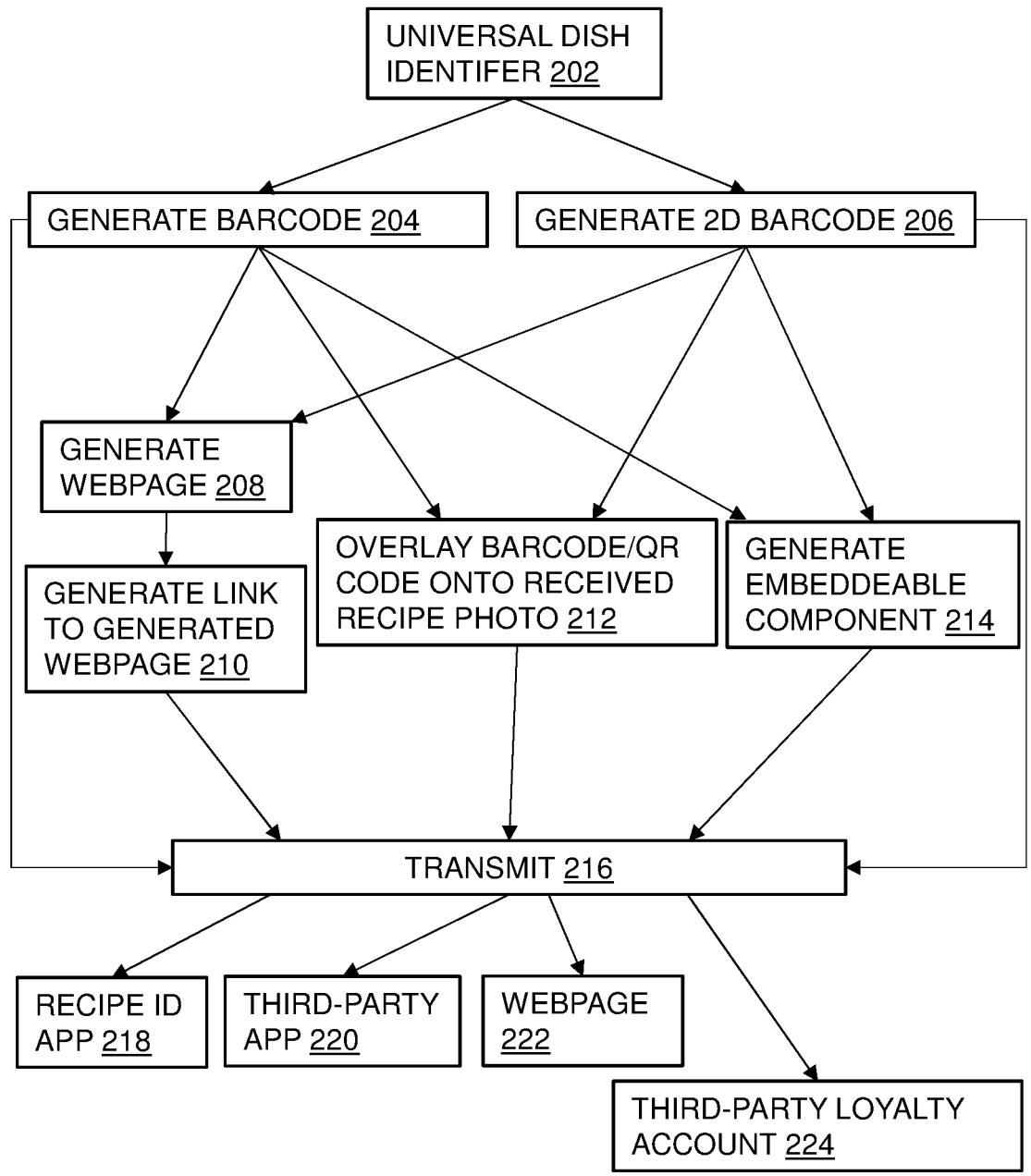
FIG. 2A depicts a flow chart 200 illustrating an exemplary method of generating and transmitting an electronically scannable code for a universal dish identifier.

FIG. 2A depicts a flow chart 200 illustrating an exemplary method of generating and transmitting an electronically scannable code for a universal dish identifier.

Referring to FIG. 2A, a universal dish identifier is generated for a particular dish, as represented by a specific recipe provided by a user (e.g., an end user customer, or recipe author or provider) of the dish data generation and tracking system. At steps 204 and 206, a barcode is generated for the universal dish identifier. The generated barcode may be a linear or one-dimensional barcode (e.g., a traditional barcode), as shown in step 204, or a two-dimensional barcode (e.g., a QR code), as shown in step 206. Once the barcode is generated in step 204 or 206, the barcode is prepared for transmission to the requesting user based on the particular form of the barcode the requesting user desires. The barcode may be transmitted to the user as a standalone webpage (steps 208 and 210), as an overlaid image on a photo of a recipe (step 212), or as an embeddable web component (step 214). For example, the user may request the barcode as a stand-alone webpage (generated at step 208), which is transmitted to the user as a link (generated at step 210) that allows the user to click the link from their mobile device and be taken to a webpage that displays the barcode. Thus, when the user is checking out at the grocery store, the user can click the received link to display the webpage with the barcode to be scanned by the grocery store's point-of-sale system. As another example, the user may request the barcode as an image overlaid on a photo of a recipe, which is transmitted back to the user as the annotated image (step 212). Thus, this allows the user to take a photo of a recipe with their mobile device and upload that photo of the recipe to the back-end server through the recipe identification app running on the mobile device. The photo of the recipe may be a photo taken from a cookbook, a grandmother's recipe card, or a screenshot of a webpage displaying a recipe. The uploaded photo is annotated with the barcode and sent back to the user, so that the user has an updated photo of the recipe that can be scanned by the grocery store's point-of-sale system. As another example, the user may request an embeddable web component with the barcode embedded in the component (step 214). In such an example, the user may be an author or publisher of recipes, such as a blogger, a vlogger, or an owner of a cooking website. The user may submit to the dish data generation and tracking server a recipe that is going to be published and receive back an embeddable web component that can be embedded on or within the website published by the author/publisher. In this way, a user who provides their own published recipes can publish or otherwise provide a pre-generated barcode along with their own recipes, adding differentiation value to customers who are searching for a recipe for a particular dish. This allows the user to access a recipe from any participating recipe publisher and scan it at the grocery store's point-of-sale system. In some embodiments, the embeddable web component may be an HTML element that displays an image of the barcode (either linear barcode or 2D barcode such as a QR code).

The embeddable web component may further be in the form of a button that the recipe publisher adds to their recipe on the website that, when the user clicks on the button, redirects them to the user's system account and adds the universal dish identifier to the user's profile within the system. As such, when the user of the system described herein is logged in to their own system account, the user may then surf for any recipe on any website, as normal. When the user finds a particular recipe of interest, if that recipe includes the link button, the user simply clicks on that link button, which adds the universal dish identifier to the user's profile within the system described here. From there, the user may directly access the universal dish identifier from the mobile app, and the user may optionally export the universal dish identifier to a grocer's loyalty account, as described in more detail below. This use of the direct website link allows the system described herein to track which websites are providing which recipes to which users, which allows for more valuable targeted advertising, as well as for tracking with the owner of the recipe website, which allows for the owner of the recipe website to pay advertising fees.

At step 216, the generated barcode is transmitted to the requesting user. As explained above, the generated barcode may be transmitted to the user in various ways, depending on the format requested by the requesting user. In addition, the generated barcode may be transmitted to various different receiving entities, such as the recipe identification app (at step 218), a third-party app, such as a grocery store's loyalty account app (at step 220), a webpage for embedding the generated barcode (at step 222), or a third-party loyalty account, such as a grocery store's loyalty account system (at step 224). The various receiving entities 218, 220, 222, and 224 can all be used by the customer at the point-of-sale system to provide the universal dish identifier to the grocer's system, which allows the grocer to make the appropriate data links and realize the value from that information through targeted incentives.

In the example where the generated barcode is transmitted to the third-party loyalty account directly, as shown in step 224, it may be the barcode that is transmitted, or it may be the universal dish identifier that is transmitted (i.e., without the barcode). To provide this functionality, the system may connect to one or more grocer's websites using, for example, available APIs that allow for such interaction. In this embodiment, the user of the system provides their login information for the third-party loyalty account (e.g., grocer's loyalty account) to the system, which then logs the user into the third-party loyalty account. Thus, the system creates a connection with the third-party loyalty account. The connection may be created by the back-end server (e.g., the connection is between the back-end server and the third-party server), or it may be created by the user device (e.g., the connection is between mobile app running on the mobile device and the third-party server). The user may provide, for example, their loyalty number, their phone number, their email address, their login information, or any other identifying information. The system uses that information to connect directly to the third-party loyalty account. Once the connection has been made, the universal dish identifier is provided directly to the third-party loyalty account, such that the user does not need to present the barcode for the universal dish identifier to the grocery store. Rather, all that is required is for the grocer to know the customer's loyalty account, which is usually accomplished either by the user scanning their grocery-specific loyalty card at the point of sale, or by the user using the grocer's mobile app directly, or, if the user is shopping online, by logging in to the grocer's website (e.g., using OAuth authentication). Additionally, the user may send other (e.g., previous, favorite, most used, most recent, etc.) universal dish identifiers or generated barcodes that are stored within the user's profile in the system described herein to one or more grocers once the connection is created. When used in this way, the grocer still knows the recipe that the user is shopping for, even if the user does not directly scan the universal dish identifier barcode at the point of sale, for example. This embodiment is particularly advantageous in the context of online shopping, where the user logs into the grocer's website to place an online order for curbside pickup of for delivery. In such a case, the user's universal dish identifier is added to their loyalty account at the back-end by the system.

In some embodiments, the mobile app for the system described herein may directly share information with other mobile apps, such as a grocer's mobile app. In these embodiments, the universal dish identifier and any other recipe data may be shared between the apps at the user's mobile device. For example, this may be accomplished using any known methods, such as data sharing in Android® devices, or using custom URLs, web services, APIs, or the like.

Figure 2B:
FIG. 2B depicts an illustrative bar code encoded to represent a universal dish identifier.
Figure 2B:
Figure 2B:
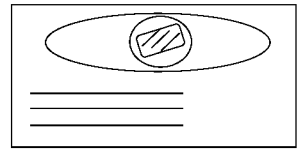
Figure 2B:

FIG. 2B depicts an illustrative bar code encoded to represent a universal dish identifier.

Referring to FIG. 2B, a universal dish identifier 252 is associated in memory with a dish 250. As explained above, when a new dish is received from a user that does not already have an associated universal dish identifier, then a new universal dish identifier is assigned to the dish. Once a dish has a universal dish identifier associated with it, a scannable code 254 for the universal dish identifier is generated and stored associated with the dish 250 and/or the universal dish identifier 252. In some embodiments, additional information may be stored associated with the particular dish and universal dish identifier. The additional information stored may include specific recipe information 256, which is the information received from the user as part of the user request. For example, the specific recipe information 256 may include a website URL for the recipe being associated with a universal dish identifier. In this way, as additional variations of recipes for the same type of dish are received, the dish data generation and tracking system described herein compiles a collection of the various (different) specific recipes for that particular dish, as well as the sources of those recipes. This additional specific recipe information provides additional value that the back-end system can use for data analytics. For example, this additional specific recipe information (e.g., such as the source of the recipe) may be used for tracking customer conversion and for determining either advertising fees that the owners of the recipe websites pay for targeted advertising, or advertising fees that the owners of the recipe websites receive from product manufacturers or other advertisers for promoting recipes that include certain products.

Additionally, in some embodiments, the additional specific recipe information may be encoded into the scannable code 254. Such additional specific recipe information may be encoded at varying, user-selectable levels of information along with the universal dish identifier. For example, the varying levels of information may include information such as a type of cuisine (e.g., Italian), main ingredient (e.g., chicken), and/or recipe source (e.g., magazine). There may be additional attributes such as nutritional information, specific author, or other attributes for further identification of the provenance of the recipe being classified. In embodiments where additional levels of information are encoded into the scannable code 254, the scannable code 254 may be a QR code, which allows for more information to be encoded into the QR code. In some embodiments, because the information is encoded directly into a QR code, the grocer has immediate access to the information when the QR code is scanned at the grocer's point-of-sale system, which allows for the avoidance of a back-end server lookup to determine identity of the dish. By avoiding a back-end server lookup, the system described herein provides an improvement to existing technology because it is more efficient by eliminating a data round-trip, which makes it faster and conserves network resources.

Figure 2C:
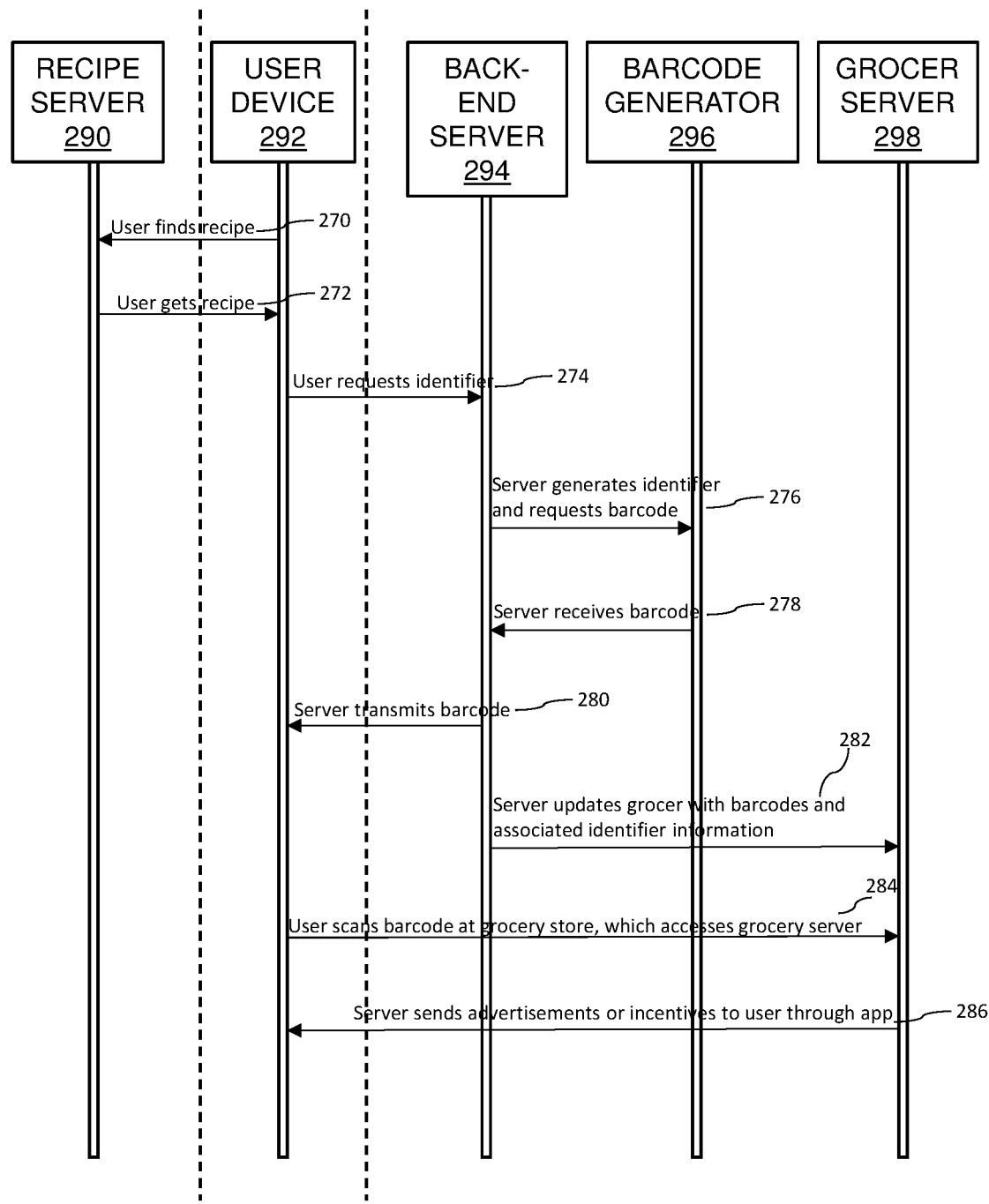
FIG. 2C depicts an exemplary data-flow diagram for the dish data generation and tracking system described herein.

FIG. 2C depicts an exemplary data-flow diagram for the dish data generation and tracking system described herein.

Referring to FIG. 2C, a user device 292 communicates with one or more recipe servers 290 and a back-end server 294. In one embodiment, the user of user device 292 finds a particular recipe of interest (data flow 270) and accesses that recipe from recipe server 290 (e.g., a website where the recipe is hosted). The user device 292 receives the recipe (data flow 272) from the recipe server 290. Once the user device 292 receives the recipe from the recipe server 290, the user then requests a universal dish identifier (data flow 274) from the back-end server 294. The back-end server 294 generates a universal dish identifier and requests a barcode for that universal dish identifier from a barcode generator 296 (data flow 276). The universal dish identifier may be added to the user's profile within the system (e.g., stored at the back-end server associated with the user). The back-end server 294 receives a barcode from the barcode generator 296 (data flow 278). The back-end server 294 stores the barcode associated with the universal dish identifier and transmits the barcode to the user device 292 (data flow 280).

The back-end server 294 periodically updates one or more grocer inventory systems with barcodes, universal dish identifiers, and/or additional associated information (data flow 282). This updated information may be used by the grocers to maintain an updated list of universal dish identifiers. When the user scans the barcode from the user device 292 into a grocer's point-of-sale system, the grocer's point-of-sale system accesses the grocer's grocery server 298 (data flow 284) to decode that barcode into the universal dish identifier and associate the universal dish identifier with the particular customer and/or that customer's grocery loyalty account. In some embodiments, the grocery's server may communicate directly with the back-end server of the dish data generation and tracking system to access the database data in real-time, for example, through one or more APIs. The grocer's server 286 may then send advertisements or other incentives to the associated customer (data flow 286), and those advertisements or incentives may be based on or relevant to the particular dish for which the user is shopping. In some embodiments, the customer need not have an associated loyalty account, meaning that the universal dish identifier information is provided to the grocery store anonymously. Even without the associated customer information, the data of particular dishes and/or sources of specific recipes for those particular dishes is valuable to the grocery store in that it provides information about customer habits that would otherwise be unavailable to the grocer.

Figure 2D:
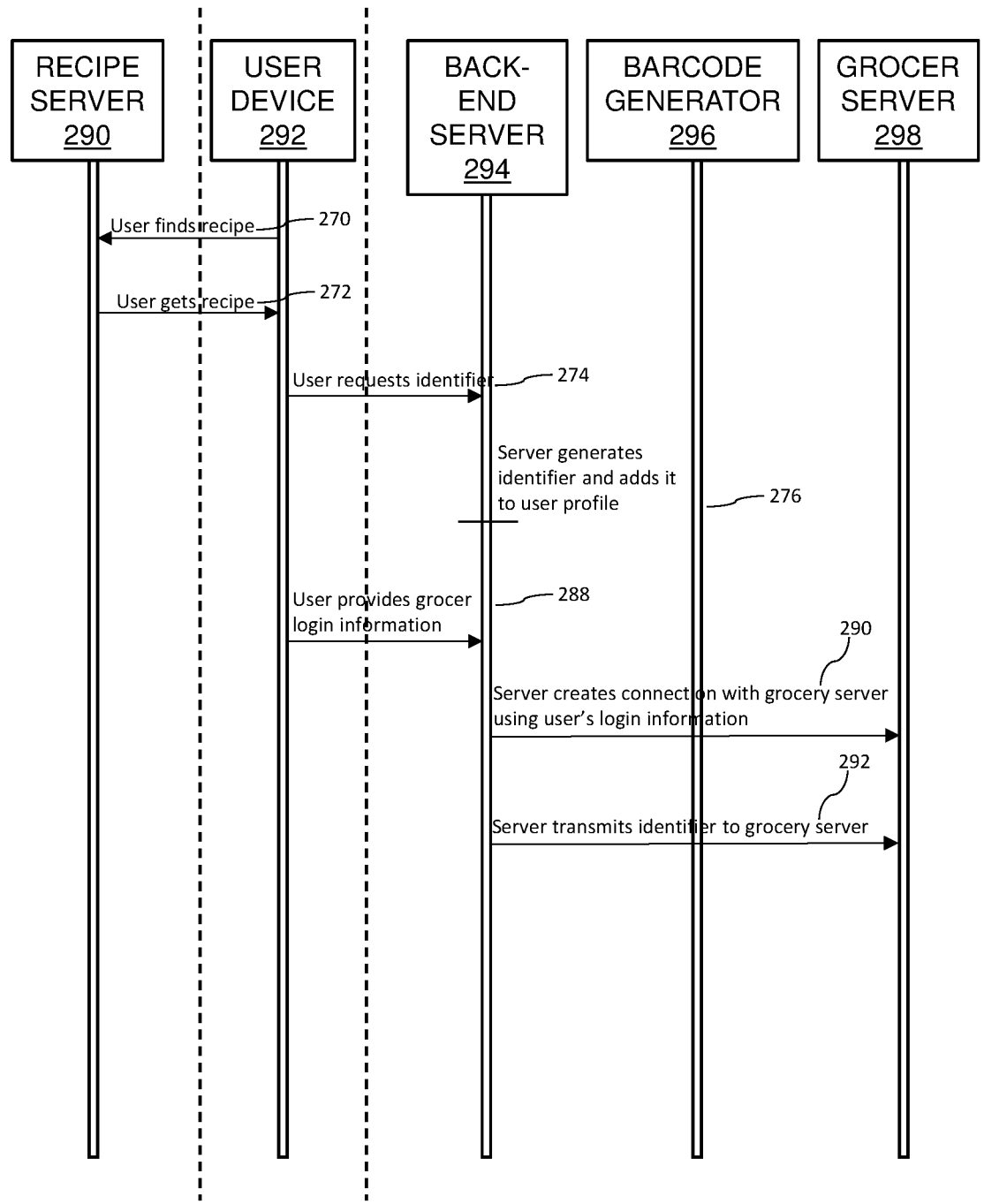
FIG. 2D depicts an exemplary data-flow diagram for the dish data generation and tracking system described herein, where the universal dish identifier is provided directly to a third-party grocery loyalty account.

FIG. 2D depicts an exemplary data-flow diagram for the dish data generation and tracking system described herein, where the universal dish identifier is provided directly to a third-party grocery loyalty account.

Referring to FIG. 2D, the initial steps 270-276 are the same as in FIG. 2C. Where the data flow of FIG. 2D differs is that, rather than send the universal dish identifier to the user to be later scanned at a point of sale, the server sends the universal dish identifier directly to one or more third-party servers where it can be directly associated with the user's grocery loyalty account.

The user provides the back-end server 294 with grocer loyalty information, such as grocer login information (data flow 288). The server 294 creates a connection with the grocery server 298 using the user's login information (data flow 290). Once the connection is established, the server 294 transmits the universal dish identifier to the grocer server 298 (data flow 292).

It will be understood here that the order of the steps of FIG. 2D need not be fixed. In other words, the user may first log in to one or more third-party grocer websites before separately sending dish data and getting the universal dish identifier. It will further be understood that the methods of FIGS. 2C and 2D are not mutually exclusive, such that they can both be performed together, meaning that the universal dish identifier may be directly sent to the third-party grocery server (as shown in FIG. 2D) and also encoded into a readable format and sent to the user (as shown in FIG. 2C).

Figure 3:
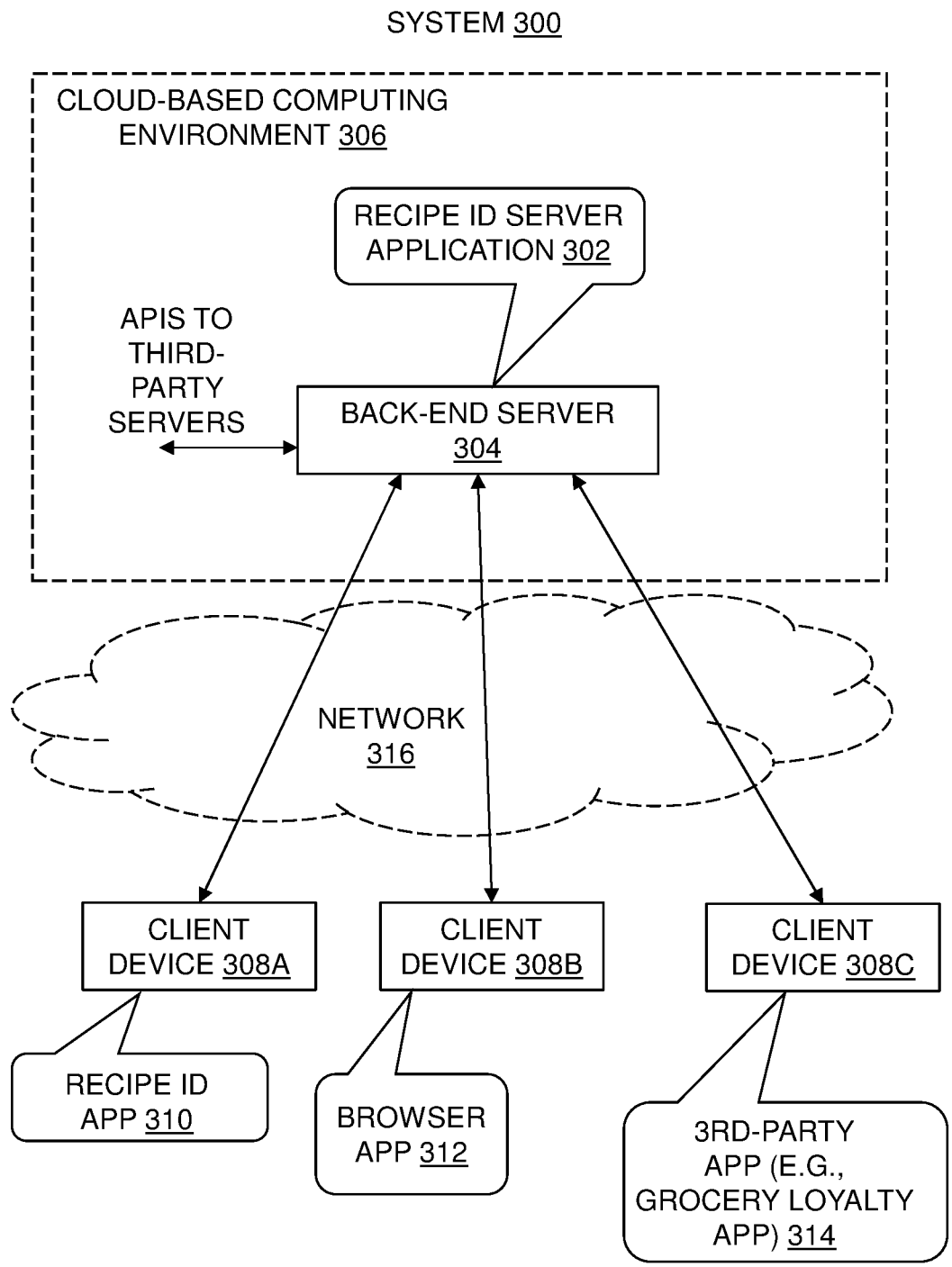
FIG. 3 depicts a system 300 implementing the dish data generation and tracking system as a client/server architecture.

FIG. 3 depicts a system 300 implementing the dish data generation and tracking system as a client/server architecture. The system 300 includes a recipe-identification server application 302 hosted on a back-end server 304. The back-end server 304 may be resident in a cloud-based computing environment 306. The back-end server 304 may communicate with a plurality of client devices 308A-C. The client devices 308A-C and their users may access the recipe identification server application 302 using a recipe identification app 310, a browser app 312, or a third-party app 314. The client devices 308A-C may be smart tablets, laptops, workstations, PCs, smart TVs, or the like. The client devices 308A-C may communicate with the recipe-identification server application 302 over a network 316. The network 316 may be any type or combination of wired, wireless, and/or optical networks. The network 316 may include one or more of the previously described networks.

The back-end server 304 running the recipe-identification server application 302 may perform any of the methods described in the summary, detailed description, figures, and/or claims. The recipe-identification server application 302 may also interface to one or more third-party servers via an application programming interface (API). The third-party servers may include, for example, a barcode-generation system, a 2D-barcode generator (e.g., QR code generator), grocery-store inventory systems that manage barcode information, grocery-store servers that maintain customer-loyalty information, CPG servers that maintain product information, and/or advertising servers or networks that provide targeted advertising to users.

The recipe-identification server application 302 transforms the back-end server 304 from a generic computer function into a machine for solving the problem of identifying recipes for which a customer is shopping and allowing that information to be linked to the customer's grocery loyalty account at the point of sale by generating new dish data that otherwise does not exist for the grocers.

Figure 4:
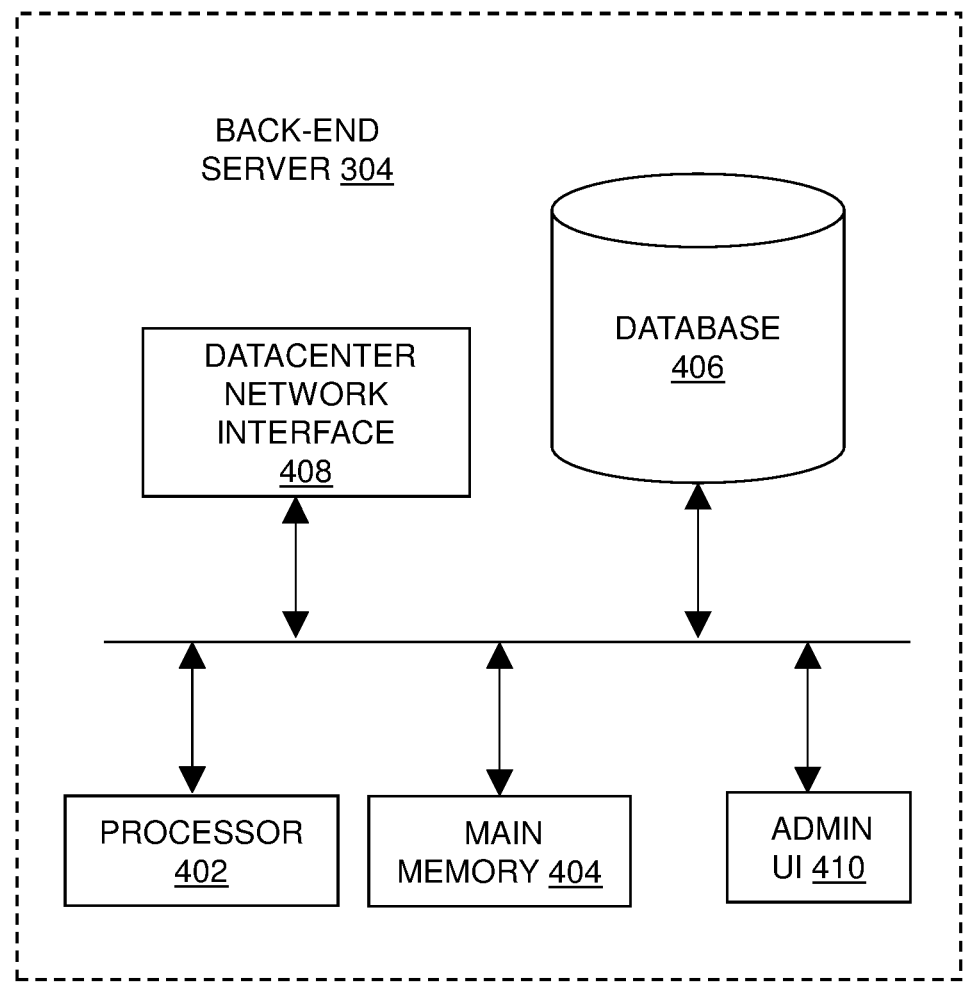
FIG. 4 illustrates an example block diagram of one embodiment of the back-end server 304 of FIG. 3.

FIG. 4 illustrates an example block diagram of one embodiment of the back-end server 304 of FIG. 3. The back-end server 304 may include at least one of processor 402, a main memory 404, a database 406, a datacenter network interface 408, and an administration user interface (UI) 410. The back-end server 304 may be configured to host the Ubuntu® server as discussed earlier. In some embodiments Ubuntu® server may be distributed over a plurality of hardware servers using hypervisor technology.

The processor 402 may be a multi-core server class processor suitable for hardware virtualization. The processor may support at least a 64-bit architecture and a single instruction multiple data (SIMD) instruction set. The main memory 404 may include a combination of volatile memory (e.g. random-access memory) and non-volatile memory (e.g. flash memory). The database 406 may include one or more hard drives.

The datacenter network interface 408 may provide one or more high-speed communication ports to the data center switches, routers, and/or network storage appliances. The datacenter network interface 408 may include high-speed optical Ethernet, InfiniBand (IB), Internet Small Computer System Interface (iSCSI), and/or Fibre Channel interfaces. The administration UI may support local and/or remote configuration of the back-end server 304 by a datacenter administrator.

Figure 5:
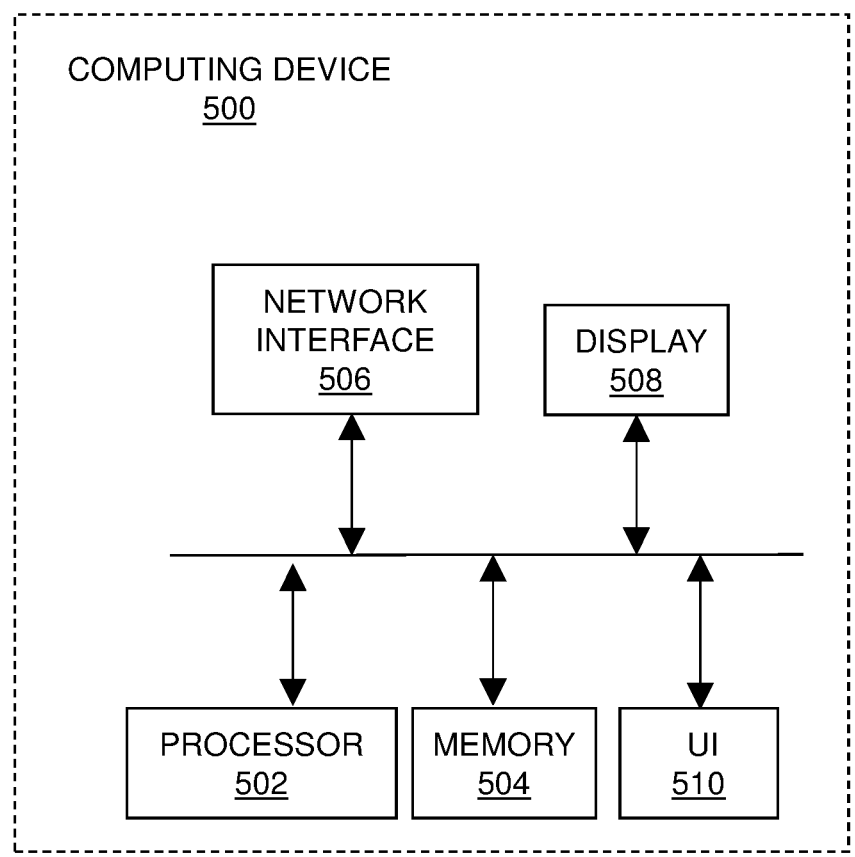
FIG. 5 depicts a block diagram illustrating one embodiment of a computing device 500.

FIG. 5 depicts a block diagram illustrating one embodiment of a computing device 500. The workstation may be any of the client devices 308A-C of FIG. 3. The computing device 500 may include at least one processor 502, a memory 504, a network interface 506, a display 508, and a UI 510. The memory 504 may be partially integrated with the processor 502. The UI 510 may include a keyboard and a mouse. The display 508 and the UI 510 may provide any of the GUIs in the embodiments of this disclosure.

Figure 6:
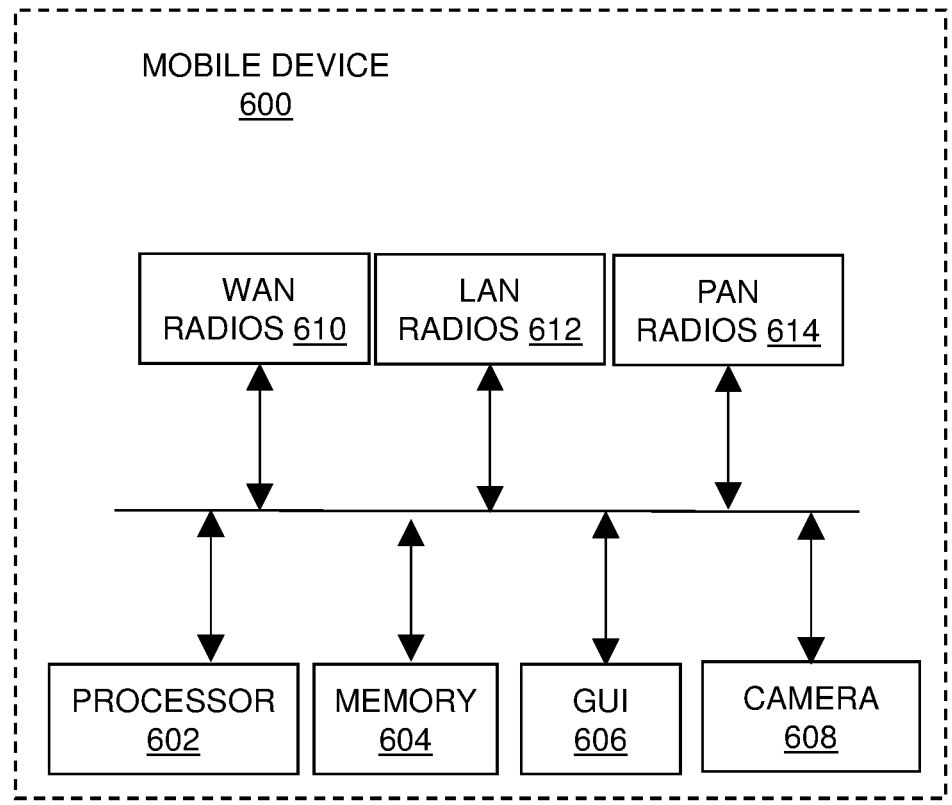
FIG. 6 depicts a block diagram illustrating one embodiment of a mobile device 600.

FIG. 6 depicts a block diagram illustrating one embodiment of a mobile device 600. The mobile device 600 may be any of the client devices 308A-C of FIG. 3. The mobile device 600 may be a smart tablet. The mobile device 600 may include at least a processor 602, a memory 604, a GUI 606, a camera 608, WAN radios 610, LAN radios 612, and PAN radios 614. In some embodiments, the mobile device 600 may be a laptop, a tablet, or the like.

In some embodiments, the processor 602 may be a mobile processor such as the Qualcomm® Snapdragon™ mobile processor. The memory 604 may include a combination of volatile memory (e.g. random-access memory) and non-volatile memory (e.g. flash memory). The memory 604 may be partially integrated with the processor 602. The GUI 606 may be a touchpad display. The WAN radios 610 may include 2G, 3G, 4G, and/or 5G technologies. The LAN radios 612 may include Wi-Fi technologies such as 802.11a, 802.11b/g/n, 802.11ac, 802.11.ax or the like circuitry. The PAN radios 614 may include Bluetooth® technologies.

Figure 7:
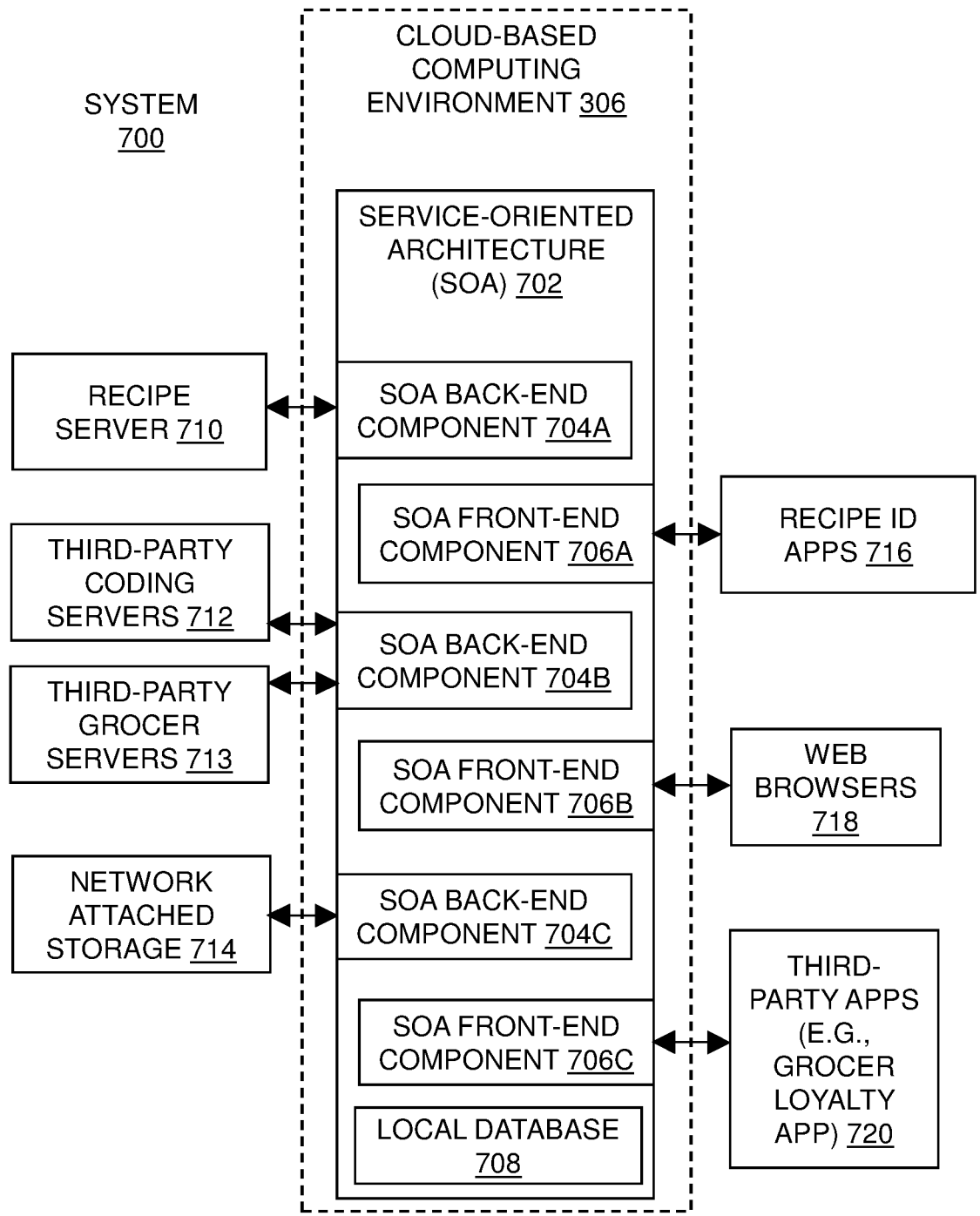
FIG. 7 depicts a system 700 illustrating a further embodiment of the dish data generation and tracking system.

FIG. 7 depicts a system 700 illustrating a further embodiment of the dish data generation and tracking system. The system 700 includes a service-oriented architecture (SOA) 702 implemented within a cloud-based computing environment 306. The SOA 702 provides a collection of services, wherein the services communicate with each other. The communications may range from simple exchanges of data to two or more services coordinating one or more activities. Each service may be a function that is self-contained and well-defined. Each service may not depend on a state or context of each of the other services.

The SOA 702 includes SOA back-end components 704A-C and front-end components 706A-C for facilitating one or more users in generating and tracking dish data. The SOA also includes a database 708. In some embodiments, the database 708 may be an open source database such as the MongoDB® database, the PostgreSQL® database, or the like. An additional front-end component (not shown in FIG. 7) may be configured to provide an administrator access secure web portal. The administrator access secure web portal may be configured to provide status and control of the operable SOA solution.

The SOA back-end component 704A is configured to communicate with at least one recipe server 710. The SOA back-end component 704B is configured to communicate with at least one third-party coding server 712, such as a barcode generator or a QR code generator, and/or one third-party grocer server 713, such as an inventory system or customer-loyalty system. In some embodiments, the back-end server communicates with the barcode generator or QR code generator to get a new barcode or QR code generated for the universal dish identifier. In other embodiments, the barcode generation or QR code generation may be performed by the back-end server itself. In some embodiments, the back-end server communicates with third-party grocer servers to update the grocer's loyalty and/or inventory systems so that the universal dish identifier and associated additional information so that the information from the dish data generation and tracking system is available for use by the grocer's system, such as the point-of-sale system. The SOA back-end component 704C is configured to communicate with network attached storage 714. In some embodiments the SOA back-end components 704A-C may also use one or more transfer protocols such as a hypertext transfer protocol (HTTP) session, an HTTP secure (HTTPS) session, a secure sockets layer (SSL) protocol session, a transport layer security (TLS) protocol session, a datagram transport layer security (DTLS) protocol session, a file transfer protocol (FTP) session, a user datagram protocol (UDP), a transport control protocol (TCP), or a remote direct memory access (RDMA) transfer protocol.

The SOA front-end component 706A is configured communicate with a plurality of recipe identification applications 716 installed on a plurality of client devices. The SOA front-end component 706B is configured to communicate with a plurality of web browsers 718 installed on a plurality of client devices. The SOA front-end component 706C is configured to communicate with a plurality of third-party applications 720 installed on a plurality of client devices. The client devices may be any of the previously described client device.

The SOA 702 may be implemented on one or more servers. The SOA 702 may include a non-transitory computer readable medium including a plurality of machine-readable instructions which when executed by one or more processors of the one or more servers are adapted to cause the one or more servers to perform a method of dish data generation and tracking. The method may include the methods described in FIG. 1 and/or FIGS. 2A-2C.

In one embodiment, the SOA 702 may be implemented on a virtual (i.e. software implemented) server in a cloud computing environment. An Ubuntu® server may provide the virtual server and may be implemented as a separated operating system (OS) running on one or more physical (i.e. hardware implemented) servers. Any applicable virtual server may by be used for the Ubuntu® Server function. The Ubuntu® Server function may be implemented in the Microsoft Azure®, the Amazon Web Services® (AWS), or the like cloud computing data center environments. In other embodiments, the SOA 702 may be implemented on one or more servers in a networked computing environment located within a business premise or another data center. In some embodiments, the SOA 702 may be implemented within a virtual container, for example the Docker® virtual container.

In summary, the SOA front-end components are operable to be combined with the SOA back-end components of FIG. 7 to form an operable SOA solution. The SOA of system 700 transforms the one or more servers into a machine that solves the problem of efficiently determining a link between a customer's preferred recipe and/or source of recipes and that customer's grocery loyalty account.

A person having ordinary skill in the art will also recognize that the principles of the dish data generation and tracking system described herein may further be utilized in other retail sectors for other pre-defined shopping lists, for instance, in the home-improvement sector for a pre-defined home-improvement project, or in the home-goods sector for a pre-college moving list.

It should be apparent to a person having ordinary skill in the art of the value to grocers, CPG manufacturers, and advertisers of the newly generated dish data. Such newly generated dish data allows these entities to understand the shopping habits of their customers. As explained above, in some embodiments, the universal dish identifiers presented by the customer (through a scannable code) may be linked to the customer's grocery loyalty account. In such a scenario, for example, the end-user customer scans their loyalty account information during the check-out process and then scans their universal dish identifier (e.g., as a barcode, QR code, etc.). These two back-to-back scans, when used by the grocer, enable the grocer to establish a link between the particular user (via their user loyalty account) and the particular dish for which the customer is shopping, regardless of which products are actually in the customer's cart during that shopping trip. When the grocer scans the barcode or QR code for the universal dish identifier, the grocer can access its own back-end system (which has been updated by the dish data generation and tracking system described herein) or the dish data generation and tracking system directly to gather more information associated with the universal dish identifier. At a minimum, the grocer can access the particular dish (though not necessarily the specific recipe) identified by the universal dish identifier. In some embodiments, the grocer can further access additional information associated with the universal dish identifier, such as the specific recipe for that particular dish, the author/provider of that recipe, and any additional sublevels of information, such as those described above (e.g., main ingredient, cuisine type, sauce type, etc.). In other embodiments, such additional information associated with the universal dish identifier encoded into the QR code and then Additionally, and importantly, the newly generated dish data can be used by grocers, CPG manufacturers, and advertisers to generate targeted advertisements, coupons, and/or incentives to the end-user customer. As explained, the dish data generation and tracking system described herein makes available to the grocers information associated with the universal dish identifier (either directly without a back-end lookup through a QR code, or indirectly with a back-end lookup through a barcode). When linked to a customer's loyalty account, that newly generated dish data becomes valuable to the grocer. For example, if the grocer determines based on the universal dish identifier that a particular customer shops weekly for the same particular dish (regardless of what specific recipe they use), the grocer can use that information to send targeted ads to the customer. In such a case, for example, the grocer may determine that the customer shops for Chicken Parmesan every week but never buys chicken breasts as part of their cart. From that information, the grocer my determine that the customer is buying their chicken breasts from another store. With that information, the grocer may send a targeted coupon to the customer for discounted chicken breast to encourage the customer to begin buying their chicken from the grocer as well, essentially providing a significant opportunity to get the customer to switch their source. Such information is significantly more valuable to a grocer because it shows the grocer their weaknesses and opportunities in real-time and allows them to address those specific weaknesses and opportunities exactly where they exist, rather than having to guess or send blanketed ads.

Such information may be used by the grocer in other ways as well. For example, if the grocer knows that the customer is shopping for ingredients to prepare Chicken Parmesan, then the grocer may send a targeted ad for a bottle of Italian red wine, garlic bread, and tiramisu. Similarly, the grocer may adjust their targeted ads in other ways, for example in some regions of the country, a grocer may suggest vanilla ice cream to go with a universal dish identifier for apple pie, whereas in other regions of the country, the grocer may suggest slices of cheddar cheese to go with a universal dish identifier for apple pie.

As mentioned, such information may also be used by CPG manufacturers and/or other advertisers to generate targeted advertisements, coupons, and/or incentives to the end-user customer. The advertiser (whether a CPG manufacturer or other type of advertiser) may target ads directly within the system's mobile application such that when a user logs in to the system via, for example, the mobile app or the web-based interface, the user may be presented with targeted ads and/or coupons based on the user's existing recipe universal dish identifiers. The determination of the targeted ads may be based on any criteria, such as particular grocery stores that the user shops at, as determined by the loyalty accounts, or the user's profile generated based on historical recipes and/or universal dish identifiers. The ads/coupons provided directly to the user through the system may further be integrated with the user's associated loyalty accounts, such that if the user wishes to redeem one of the coupons from the mobile app, the user selects to send that coupon to a particular grocer. This may be accomplished, for example, as described above in the context of step 224, such that the coupon is directly added to the user's loyalty account for a particular grocer of the user's choosing.

As can be seen, the system described herein allows for the building of a database of new information, which is information that relates to a particular user's recipe and shopping habits. Additionally, the system described herein will naturally, over time, build its own collection of various specific recipes broken down by, among other things, universal dish identifier. In one embodiment, the system described herein provides search functionality to the users, such that a user need not search externally for a particular recipe, but rather can search within the system described herein to find existing recipes based on, for example, text searching, searching by universal dish identifier, and/or searching by recipe source.

As will be appreciated by one skilled in the art, aspects of the technology described herein may be embodied as a system, method or computer program product. Accordingly, aspects of the technology may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the technology may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the technology described herein may be written in any combination of one or more programming languages, including object oriented and/or procedural programming languages. Programming languages may include, but are not limited to: Ruby®, JavaScript®, Java®, Python®, PHP, C, C++, C#, Objective-C®, Go®, Scala®, Swift®, Kotlin®, OCaml®, or the like. The program code may execute entirely on the user's computer, partly on the user's computer, as a stand-alone software package, partly on the user's computer, and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the technology described herein refer to flowchart illustrations and/or block diagrams of methods, apparatus (systems) and computer program products according to various embodiments. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technology described herein. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a," "an" and "the" are intended to include the plural forms as well, unless the context clearly indicates otherwise. Thus, for example, reference to "a user" can include a plurality of such users, and so forth. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description provided herein has been presented for purposes of illustration and description, but is not intended to be exhaustive or limited to the specific form disclosed. Many modifications and variations will be apparent to those of ordinary skill in the art without departing from the scope and spirit of the disclosure. The embodiment was chosen and described in order to best explain the principles described herein and the practical application of those principles, and to enable others of ordinary skill in the art to understand the technology for various embodiments with various modifications as are suited to the particular use contemplated.

The descriptions of the various embodiments of the technology disclosed herein have been presented for purposes of illustration, but these descriptions are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A server comprising:
a memory;
a database; and
a processor that generates dish data for a dish described by one of a plurality of recipes for the dish, the processor being configured for:
receiving recipe data that describes the dish, wherein the recipe data is received as part of an electronic request from an application running on a client device associated with the user;
identifying the dish described by the received recipe data;
generating a universal dish identifier for the identified dish in response to a determination that the identified dish does not already have an associated universal dish identifier, wherein the determination is made by performing a lookup for the identified dish in the database;
receiving grocery loyalty account information from the user;
creating, using the received grocery loyalty account information, a connection to a third-party website associated with the received grocery loyalty account information, wherein the connection is specific to the user; and
transmitting the generated universal dish identifier to the third-party website associated with the received grocery loyalty account information over the connection.

2. The server of claim 1, wherein the received grocery loyalty account information includes an identifier for a particular grocer.

3. The server of claim 1, wherein the received grocery loyalty account information includes the user's loyalty account number.

4. The server of claim 1, wherein the received grocery loyalty account information includes the user's login information for a third-party grocery website.

5. The server of claim 1, wherein the connection to the third-party website associated with the received grocery loyalty account information is created using an API.

6. The server of claim 1, wherein the connection to the third-party website associated with the received grocery loyalty account information is created using OAuth authentication.

7. The server of claim 1, wherein the dish described by the received recipe data is identified based on information contained in the received recipe data.

8. The server of claim 1, wherein the dish described by the received recipe data is identified based on input from the user.

9. The server of claim 1, wherein the client device is a smartphone.

10. The server of claim 1, wherein the processor is further configured for transmitting additional recipe data to the third-party website associated with the received grocery loyalty account information over the connection along with the generated universal dish identifier.

11. A server comprising:
a memory;
a database; and
a processor that generates dish data for a dish described by one of a plurality of recipes for the dish, the processor being configured for:
receiving recipe data that describes the dish, wherein the recipe data is received as part of an electronic request from an application running on a client device associated with the user, wherein the electronic request is received in response to the user of the client device activating a link button associated with the recipe data displayed on a website;
identifying the dish described by the received recipe data;
generating a universal dish identifier for the identified dish in response to a determination that the identified dish does not already have an associated universal dish identifier, wherein the determination is made by performing a lookup for the identified dish in the database;
storing the universal dish identifier in the database, wherein the universal dish identifier is stored associated with the user as part of a user profile for the user.

12. The server of claim 11, wherein the processor is further configured for:
receiving grocery loyalty account information from the user;
creating, using the received grocery loyalty account information, a connection to a third-party website associated with the received grocery loyalty account information, wherein the connection is specific to the user; and
transmitting the generated universal dish identifier to the third-party website associated with the received grocery loyalty account information over the connection.

13. The server of claim 12, wherein the received grocery loyalty account information includes an identifier for a particular grocer.

14. The server of claim 12, wherein the received grocery loyalty account information includes the user's loyalty account number.

15. The server of claim 12, wherein the received grocery loyalty account information includes the user's login information for a third-party grocery website.

16. The server of claim 12, wherein the connection to the third-party website associated with the received grocery loyalty account information is created using an API.

17. The server of claim 12, wherein the connection to the third-party website associated with the received grocery loyalty account information is created using OAuth authentication.

18. The server of claim 11 wherein the dish described by the received recipe data is identified based on information contained in the received recipe data.

19. The server of claim 11, wherein the client device is a smartphone.

20. The server of claim 12, wherein the processor is further configured for transmitting additional recipe data to the third-party website associated with the received grocery loyalty account information over the connection along with the generated universal dish identifier.

* * * * *